United States Patent
Bodtker

(10) Patent No.: US 11,603,124 B2
(45) Date of Patent: Mar. 14, 2023

(54) MOTION CONTROL ASSEMBLY FOR ADJUSTABLE STEERING COLUMN

(71) Applicant: Steering Solutions IP Holding Corporation, Saginaw, MI (US)

(72) Inventor: Joen C. Bodtker, Gaines, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 329 days.

(21) Appl. No.: 16/791,180

(22) Filed: Feb. 14, 2020

(65) Prior Publication Data

US 2020/0180675 A1    Jun. 11, 2020

Related U.S. Application Data

(62) Division of application No. 15/495,131, filed on Apr. 24, 2017, now Pat. No. 10,611,396.

(51) Int. Cl.
 *B62D 1/184* (2006.01)
(52) U.S. Cl.
 CPC .................................. *B62D 1/184* (2013.01)
(58) Field of Classification Search
 CPC ....................................................... B62D 1/184
 See application file for complete search history.

(56) References Cited

U.S. PATENT DOCUMENTS

| | | | |
|---|---|---|---|
| 4,594,909 A * | 6/1986 | Yamaguchi | B62D 1/184 74/540 |
| 4,938,093 A * | 7/1990 | Matsumoto | B62D 1/183 74/540 |
| 5,605,351 A | 2/1997 | Higashino | |
| 5,730,465 A | 3/1998 | Barton | |
| 7,413,222 B2 | 8/2008 | Higashino | |
| 7,445,241 B2 | 11/2008 | Higashino | |
| 7,874,228 B2 | 1/2011 | Clark | |
| 8,863,609 B2 | 10/2014 | Tinnin | |
| 8,899,128 B2 | 12/2014 | Maniwa | |
| 9,527,521 B2 * | 12/2016 | Stinebring | B62D 1/184 |
| 11,046,351 B2 * | 6/2021 | Davies | B62D 1/184 |
| 2006/0170204 A1 * | 8/2006 | Higashino | B62D 1/184 280/775 |
| 2006/0207380 A1 | 9/2006 | Higashino | |
| 2013/0192409 A1 * | 8/2013 | Stinebring | B62D 1/184 74/493 |

* cited by examiner

*Primary Examiner* — James M Dolak
*Assistant Examiner* — Joselynn Y Sliteris
(74) *Attorney, Agent, or Firm* — Dickinson Wright PLLC

(57) ABSTRACT

A motion control assembly for a steering column assembly includes a rake bracket having a first leg and a second leg. Also included is a clamping mechanism intersecting the upper jacket and positioned on the first leg of the rake bracket, the on-center, single-sided clamping mechanism moveable between a clamped condition and an unclamped condition, the clamped condition securing a lower jacket against telescoping movement relative to an upper jacket. Further included is a mechanical fastener extending through the second leg of the rake bracket and at least partially through the lower jacket and operatively coupled to the lower jacket.

5 Claims, 4 Drawing Sheets

MOTION CONTROL ASSEMBLY FOR ADJUSTABLE STEERING COLUMN

CROSS-REFERENCE TO RELATED APPLICATION

This application is a divisional application of, and claims priority to, U.S. patent application Ser. No. 15/495,131, filed on Apr. 24, 2017, the disclosure of which is incorporated by reference herein in its entirety.

BACKGROUND OF THE DISCLOSURE

The following description relates to an adjustable steering column and, more particularly, a motion control assembly for such steering columns.

Adjustable steering columns may be adjustable in a rake direction and a telescope direction. A traditional adjustable steering column includes a clamp mechanism that is actuatable between a clamped position where adjustment of the steering column is prevented and an unclamped position where adjustment of the steering column is allowed. Typically, the clamp mechanism is actuated between clamped and unclamped positions by rotation of a lever.

In traditional adjustable steering columns, a bolt and lever extend along an axis that is spaced from the steering shaft so that the bolt may extend completely across a rake bracket without interfering with shaft components. However, such a configuration may use additional space in and around the steering column assembly and possibly interfere with passenger movement in a vehicle cabin. Packaging requirements restrict the location of a rake and telescope locking devices.

Accordingly, some adjustable steering columns have a mechanism, such as a clamp mechanism, on or near a center of the steering column with an actuating lever similarly positioned. When the clamp axis intersects the steering shaft, it is difficult or expensive to clamp to both legs of the rake bracket, as is typical with high or low mounted clamp systems. One solution is to clamp only on one rake bracket leg, typically the leg adjacent to the actuating lever. Unfortunately, the rigidity and natural frequency of the steering column is not high enough when only one side is clamped in some assemblies.

SUMMARY OF THE DISCLOSURE

According to one aspect of the invention, an adjustable steering column is provided. The column includes a rake bracket having a bridge, a first leg extending from the bridge, and a second leg extending from the bridge. Also included is a lower jacket extending within the rake bracket, the lower jacket having an axial opening extending along a longitudinal direction of the lower jacket, the axial opening extending along a first axis. Further included is an upper jacket extending along the first axis and telescopically received in the axial opening of the lower jacket. Yet further included is a rake bolt extending through the first leg of the rake bracket and along a second axis, the second axis intersecting the upper jacket, at least a portion of the rake bolt received within the lower jacket. Also included is a clamping mechanism positioned on the first leg of the rake bracket to apply a clamping force to the upper jacket in a clamped condition to secure the upper jacket against telescoping movement relative to the lower jacket. Further included is a motion control assembly extending through the second leg of the rake bracket and operatively coupled to the lower jacket to control relative movement between the rake bracket and the lower jacket in the clamped condition.

According to another aspect of the invention, an adjustable steering column is provided. The column includes a rake bracket having a first leg and a second leg. Also included is a lower jacket extending within the rake bracket. Further included is an upper jacket extending along the first axis and telescopically received in the lower jacket. Yet further included is a rake bolt extending through the first leg of the rake bracket, at least a portion of the rake bolt received within the lower jacket. Also included is a clamping mechanism positioned on the first leg of the rake bracket to dispose the upper jacket in a clamped condition to secure the upper jacket against telescoping movement relative to the lower jacket. Further included is a motion control assembly comprising a mechanical fastener extending through the second leg of the rake bracket and at least partially through the lower jacket to control relative movement between the rake bracket and the lower jacket in the clamped condition.

According to yet another aspect of the invention, a motion control assembly for a steering column assembly includes a rake bracket having a first leg and a second leg. Also included is a clamping mechanism intersecting the upper jacket and positioned on the first leg of the rake bracket, the on-center, single-sided clamping mechanism moveable between a clamped condition and an unclamped condition, the clamped condition securing a lower jacket against telescoping movement relative to an upper jacket. Further included is a mechanical fastener extending through the second leg of the rake bracket and at least partially through the lower jacket and operatively coupled to the lower jacket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a motion control mechanism is provided for an adjustable steering column having an on-center, single-sided clamp mechanism.

Figure 1:
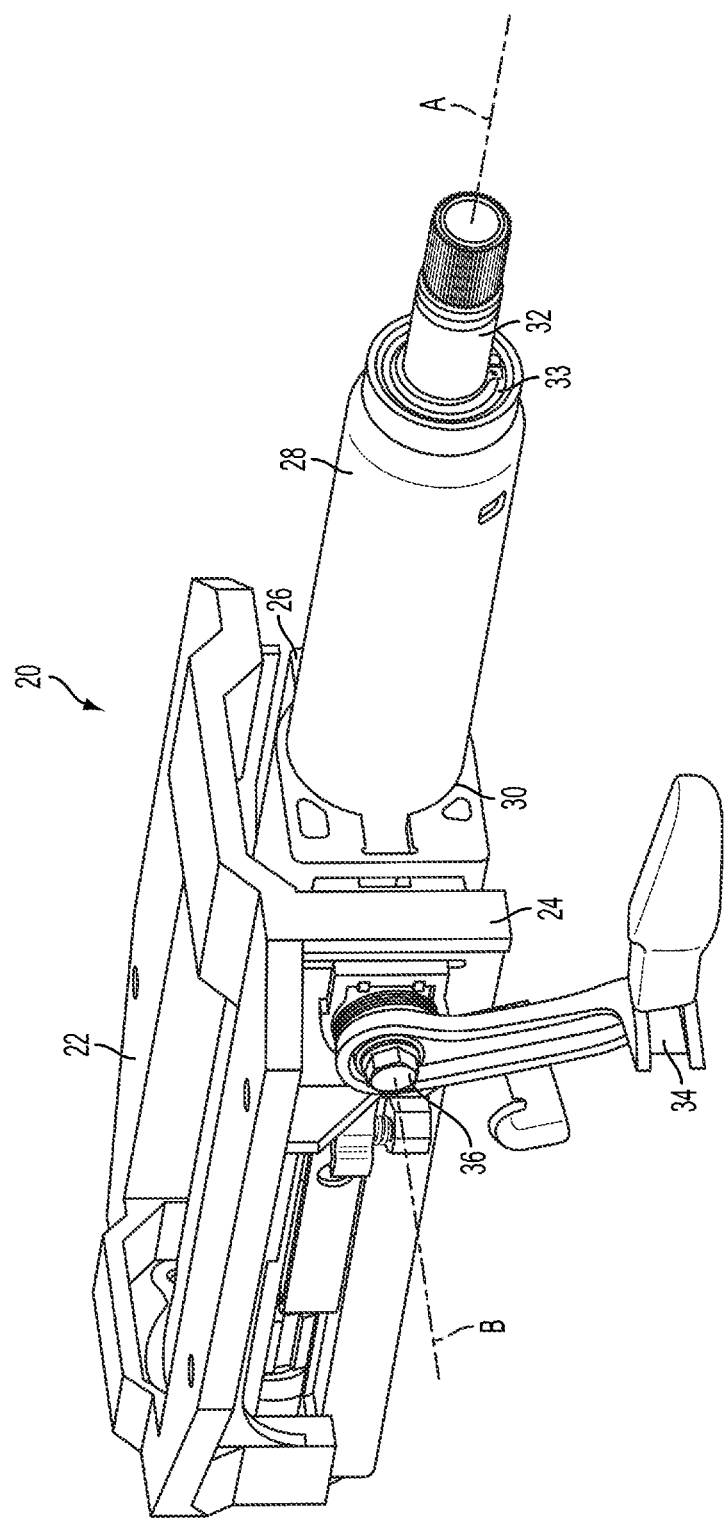
FIG. 1 is a perspective view of an adjustable steering column.
Figure 3:
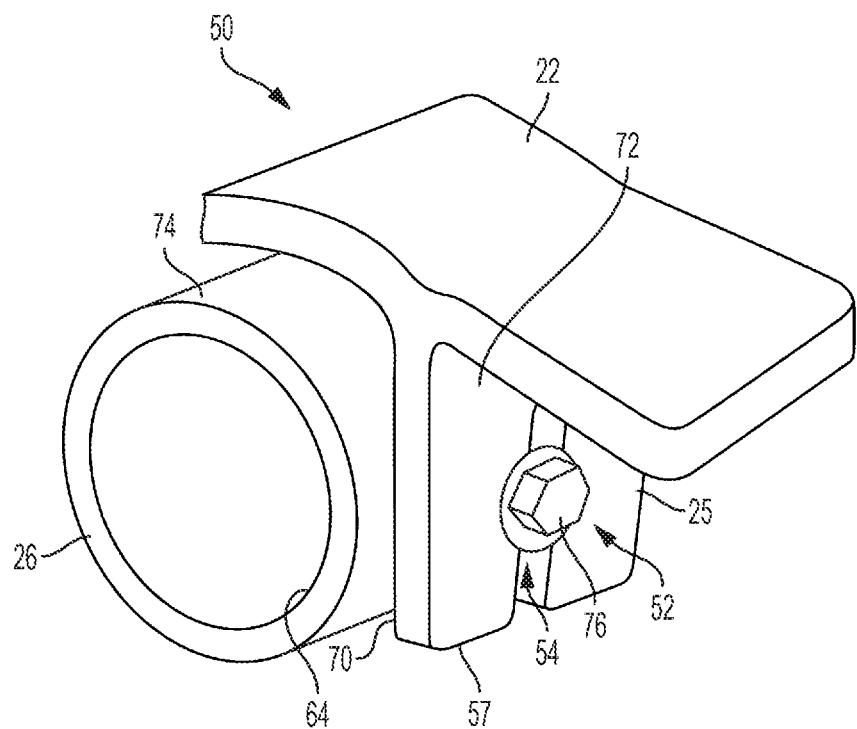
FIG. 3 is a perspective view of a motion control assembly of the adjustable steering column according to an aspect of the disclosure.
Figure 4:
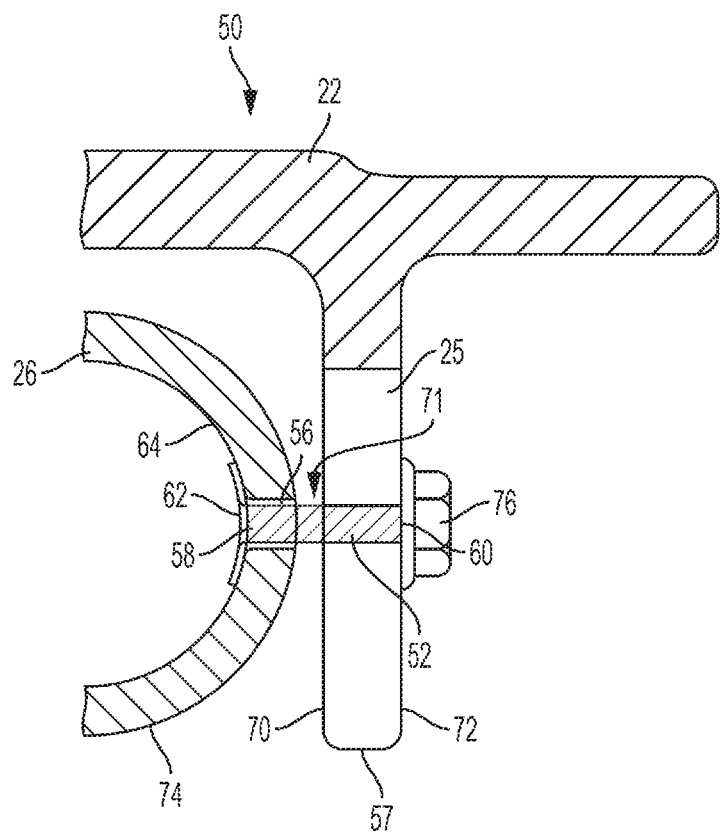
FIG. 4 is a cross-sectional view of the motion control assembly of FIG. 3.
Figure 5:
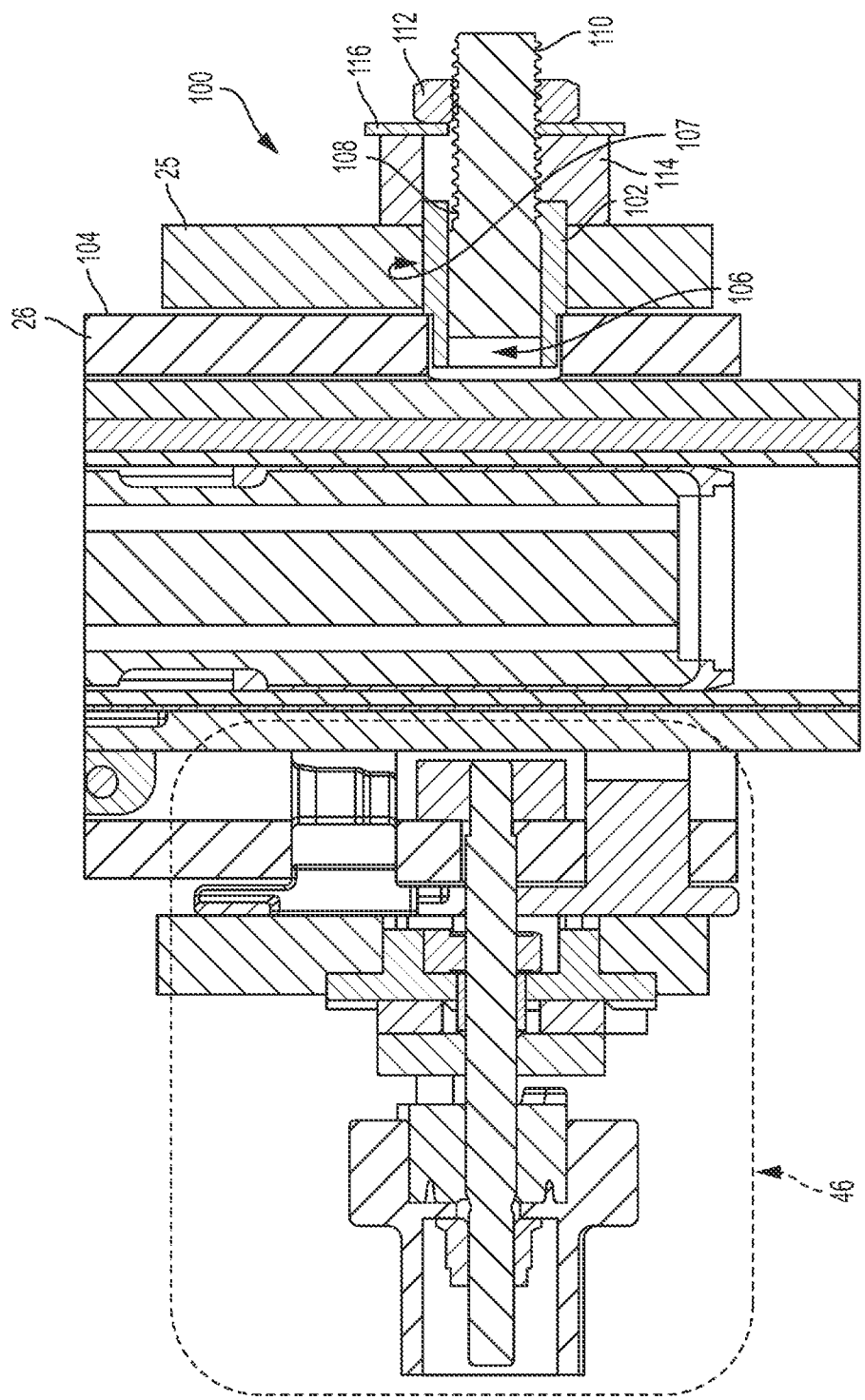
FIG. 5 is a cross-sectional view of the motion control assembly according to another aspect of the disclosure.

FIG. 1 is a perspective view of an adjustable steering column 20 according to an exemplary embodiment of the present invention. The adjustable steering column 20 includes a rake bracket 22 having a first leg 24 extending therefrom. The rake bracket 22 attaches a lower jacket 26 to the vehicle in an elevated position. A second leg 25 of the rake bracket 22 is illustrated in FIGS. 3-5.

The adjustable steering column 20 further also includes the lower jacket 26 and an upper jacket 28. The lower jacket 26 includes an axial opening 30 extending along its length on a first axis 'A'. The lower jacket 26 may be formed as an extrusion, but is not limited thereto. The upper jacket 28 extends along the first axis 'A' and is telescopically received in the axial opening 30 of the lower jacket 26. A steering shaft 32 extends from the upper jacket 28 and is configured to have a steering wheel (not shown) attached thereto. The upper jacket 28 is selectively movable in the lower jacket 26 to adjust the steering column 20 in a telescope direction, with a steering bearing 33 disposed between the steering shaft 32 and the upper jacket 28. In particular, with the adjustable steering column 20 in an unlocked, or unclamped, condition, the upper jacket 28 may be adjusted telescopically within the lower jacket 26. Conversely, with the adjustable steering column 20 in a locked, or clamped, condition, adjustment or movement of the upper jacket 28 within the lower jacket 26 is restricted.

The adjustable steering column 20 further includes an operating lever 34. The operating lever 34 is positioned on a rake bolt 36 and is configured to rotate about a second axis 'B'. Rotation of the operating lever 34 actuates the adjustable steering column 20 between the locked condition and unlocked condition as further described below.

Figure 2:
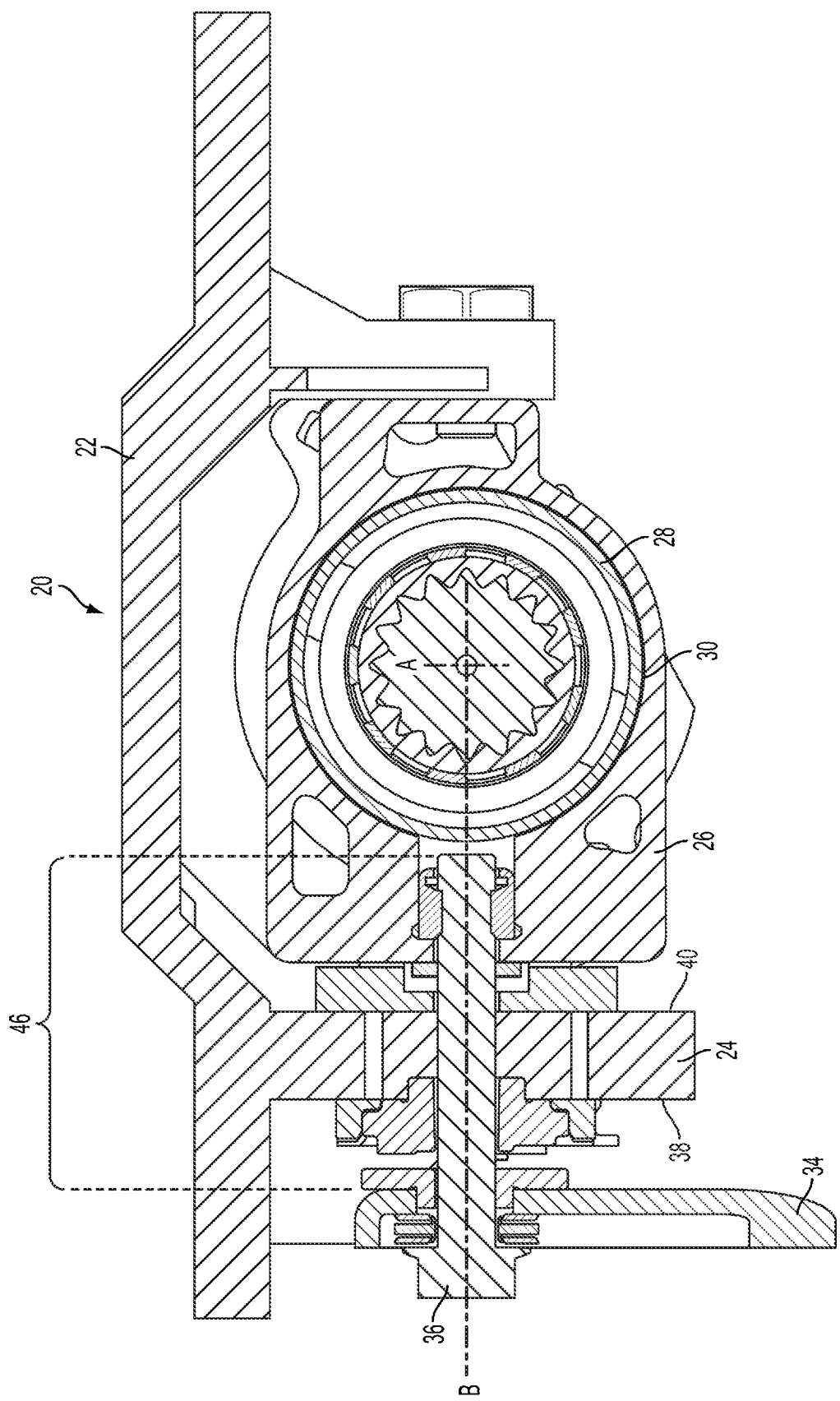
FIG. 2 is a cross-sectional view of the adjustable steering column.

FIG. 2 illustrates a cross section of the adjustable steering column 20 in the direction of the first axis 'A'. Referring to FIG. 2, the rake bolt 36 extends along the second axis 'B' through the first leg 24 of the rake bracket 22 from a first side 38 to a second side 40 of the first leg 24. A portion of the rake bolt 36 is received in the lower jacket 26 at the second side 40 of the first leg 24. The operating lever 34 is positioned on the rake bolt 36 at the first side 38 of the first leg 24.

The adjustable steering column 20 further includes a clamping mechanism 46 positioned on the rake bolt 36. The clamping mechanism 46 is configured to apply a pulling force with the rake bolt 36 against the lower jacket 26, which exerts a force on the upper jacket 28, which exerts a force on a clamp jaw, which exerts a force on the rake bracket leg, thereby securing the upper jacket against movement relative to the lower jacket 26. In the embodiments disclosed herein, the adjustable steering column 20 includes the on-center, single-sided clamping mechanism 46. By locating the rake bolt 36 and clamping mechanism 46 along an axis that intersects the upper jacket 28, space occupied by the clamping mechanism 46 in a passenger cabin of vehicle may be reduced and the clamping mechanism 46 may be more efficiently packaged.

Referring now to FIGS. 3 and 4, a motion control assembly 50 is illustrated according to an embodiment of the disclosure. As discussed above, the clamping mechanism 46 is disposed on a single side of the steering column 20. The motion control assembly 50 is employed to eliminate relative motion between the rake bracket 22 and the lower jacket 26 that may occur as a result of single sided clamping, as will be appreciated from the description herein.

In the illustrated embodiment, the motion control assembly 50 includes an adjustable contact surface 52 that extends through an opening 54 defined by the second leg 25 of the rake bracket 22 and through a hole 56 defined by the lower jacket 26. In the illustrated embodiment, the adjustable contact surface 52 is a mechanical fastener. In the illustrated embodiment, the opening 54 is an open slot that extends from an end 57 of the second leg 25, but it is to be appreciated that any opening may be suitable, such as an aperture of any other geometry (e.g., circular). The mechanical fastener 52 is a threaded fastener having a first end 58 and a second end 60. The first end 58 protrudes through the hole 54 of the lower jacket 26 and is operatively coupled to the lower jacket 26 upon engagement of a nut 62 proximate the first end 58. The nut 62 is disposed in abutment with an inner surface 64 of the lower jacket 26 to prevent the mechanical fastener 52 from being withdrawn from the hole 54 of the lower jacket 26. The nut 62 may be any type of fastener suitable for engagement with a curved surface, as the inner surface 64 of the lower jacket 26 has a degree of curvature. For example, a weld nut, a T-nut or a J-nut may be employed. The preceding list of fasteners is merely illustrative and not limiting of the types of components that may be employed to secure the mechanical fastener 52 to the lower jacket 26.

The second leg 25 of the rake bracket 22 includes an inner side 70 and an outer side 72. The inner side 70 is located closer in proximity to the lower jacket 26, when compared to a distance between the outer side 72 and the lower jacket 26. The inner side 70 is spaced from an outer surface 74 of the lower jacket 26 to define a clearance area 71 therebetween. This avoids undesirable friction between the lower jacket 26 and the rake bracket 22 during operation of the steering column 20. In the illustrated embodiment, the mechanical fastener 52 is a bolt with a flanged head portion 76. The flanged head portion 76 has at least one dimension greater than a width of the opening 54 of the second leg 25, thereby ensuring that the flanged head portion 76 engages the outer side 72 of the second leg 25. It is contemplated that the mechanical fastener 52 is a stud and that a nut serves as the flanged head portion and is coupled to the second end 60 of the mechanical fastener 52.

Based on coupling the first end 58 of the mechanical fastener 52 to the lower jacket 26 and the flanged head portion 76 to the outer side 72 of the second leg 25, the clearance area 71 between the second leg 25 and the lower jacket 26 may be adjusted. In adjusting the clearance area 71 size, the stiffness of the connection between the lower jacket 26 and the rake bracket 22 may be controlled. This is particularly beneficial for the steering column 20, since the clamping mechanism 46 is a single-sided, on-center mechanism. During movement between the locked condition (i.e., clamped condition) and the unlocked condition (i.e., unclamped condition), and vice versa, lateral movement of the lower jacket 26 occurs. Upon movement to the locked condition, the lower jacket 26 moves laterally away from the second leg 25 of the rake bracket 22, thereby increasing the tension that the mechanical fastener 52 is under to increase the stiffness of the overall assembly.

In some embodiments, the mechanical fastener 52 is coupled directly to the lower jacket 26. Coupling is facilitated by threading the first end 58 of the mechanical fastener 52 to a corresponding thread pattern disposed on an inner wall that defines the hole 54 of the lower jacket 26.

Referring now to FIG. 5, another embodiment of the motion control assembly is illustrated and is referenced with numeral 100. The motion control assembly 100 includes a protrusion 102 that extends from an outer surface 104 of the lower jacket 26. The protrusion 102 may be operatively coupled to the lower jacket 26 or integrally formed therewith. The protrusion 102 is a hollow member, such as a tube, having an interior passage 106 therein. The protrusion extends through an opening 107 of the second leg 25 of the rake bracket 22.

A mechanical fastener 108 is fixed to the protrusion 102 and has a portion disposed within the interior passage 106.

The mechanical fastener 108 may be fixed to the protrusion 102 in any suitable manner, including press fitting, application of an adhesive, or mechanically fastening, for example. In the illustrated embodiment, the mechanical fastener 108 is a threaded stud having a threaded portion 110 that extends out of the protrusion 102 in a direction away from axis 'A'. The threaded portion 110 is engaged with an adjustment nut 112 that may be adjusted to control the clearance area 71 between the rake bracket 22 and the lower jacket 26, thereby controlling the stiffness due to the overall system rigidity. In some embodiments, one or more components may be disposed between the second leg 25 of the rake bracket 22 and the adjustment nut 112. For example, in the illustrated embodiment, a spacer 114 and/or a washer 116 may be included to provide additional spacing and structural integrity to the motion control assembly 100. However, it is to be appreciated that the adjustment nut 112 may be in direct abutment with the second leg 25 of the rake bracket 22 or may simply be buffered with the washer 116.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column comprising:
   a rake bracket having a bridge, a first leg extending from the bridge, and a second leg extending from the bridge;
   a lower jacket extending within the rake bracket, the lower jacket having an axial opening extending along a longitudinal direction of the lower jacket, the axial opening extending along a first axis;
   an upper jacket extending along the first axis and telescopically received in the axial opening of the lower jacket;
   a rake bolt extending through the first leg of the rake bracket and along a second axis, the second axis intersecting the upper jacket, at least a portion of the rake bolt received within the lower jacket;
   a clamping mechanism positioned on the first leg of the rake bracket to apply a clamping force to the upper jacket in a clamped condition to secure the upper jacket against telescoping movement relative to the lower jacket; and
   a motion control assembly extending through the second leg of the rake bracket and operatively coupled to the lower jacket to control relative movement between the rake bracket and the lower jacket in the clamped condition,
   wherein the second leg of the rake bracket includes an inner side and an outer side, the inner side closer to the lower jacket relative to a distance between the outer side and the lower jacket, the motion control assembly comprising a threaded fastener engageable with a corresponding threaded inner surface of the lower jacket proximate a first end of the threaded fastener.

2. The adjustable steering column of claim 1, further comprising a nut threaded to the threaded fastener proximate a second end of the threaded fastener, the nut in contact with the outer side of the second leg of the rake bracket, the threaded fastener in tension in the clamped condition of the upper jacket.

3. The adjustable steering column of claim 1, wherein the lower jacket and the inner side of the second leg of the rake bracket define a clearance in the clamped condition of the clamping mechanism.

4. An adjustable steering column comprising:
   a rake bracket having a first leg and a second leg;
   a lower jacket extending within the rake bracket;
   an upper jacket extending along a first axis and telescopically received in the lower jacket;
   a rake bolt extending through the first leg of the rake bracket, at least a portion of the rake bolt received within the lower jacket;
   a clamping mechanism positioned on the first leg of the rake bracket to dispose the upper jacket in a clamped condition to secure the upper jacket against telescoping movement relative to the lower jacket; and
   a motion control assembly comprising a threaded fastener extending through the second leg of the rake bracket and at least partially through the lower jacket to control relative movement between the rake bracket and the lower jacket in the clamped condition,
   wherein the second leg of the rake bracket includes an inner side and an outer side, the inner side closer to the lower jacket relative to a distance between the outer side and the lower jacket, the motion control assembly comprising the threaded fastener engageable with a corresponding threaded inner surface of the lower jacket proximate a first end of the threaded fastener.

5. The adjustable steering column of claim 4, further comprising a nut threaded to the threaded fastener proximate a second end of the threaded fastener, the nut in contact with the outer side of the second leg of the rake bracket, the threaded fastener in tension in the clamped condition of the upper jacket.

\* \* \* \* \*